United States Patent
Raz et al.

(10) Patent No.: US 11,875,153 B1
(45) Date of Patent: Jan. 16, 2024

(54) EXECUTING CONCURRENT THREADS ON A RECONFIGURABLE PROCESSING GRID

(71) Applicant: Next Silicon Ltd, Givatayim (IL)

(72) Inventors: Elad Raz, Ramat Gan (IL); Ilan Tayari, Tzur Hadassa (IL)

(73) Assignee: Next Silicon Ltd, Givatayim (IL)

( * ) Notice: Subject to any disclaimer, the term of this patent is extended or adjusted under 35 U.S.C. 154(b) by 0 days.

(21) Appl. No.: 18/218,152

(22) Filed: Jul. 5, 2023

(51) Int. Cl.
*G06F 9/30* (2018.01)

(52) U.S. Cl.
CPC ............................... *G06F 9/30123* (2013.01)

(58) Field of Classification Search
CPC .................................................. G06F 9/30123
See application file for complete search history.

(56) References Cited

U.S. PATENT DOCUMENTS

| | | | | |
|---|---|---|---|---|
| 7,100,164 B1* | 8/2006 | Edwards | ................. | G06F 8/447 717/136 |
| 2009/0271435 A1* | 10/2009 | Yako | .................. | G06F 16/2343 |
| 2012/0089812 A1* | 4/2012 | Smith | ................... | G06F 9/4843 712/21 |
| 2013/0107289 A1* | 5/2013 | Brodzinski | ........ | G06K 15/1836 358/1.9 |
| 2020/0210223 A1* | 7/2020 | Saka | ....................... | G06F 9/546 |

* cited by examiner

*Primary Examiner* — Farley Abad

(57) ABSTRACT

A system for processing a plurality of concurrent threads comprising: a reconfigurable processing grid, comprising logical elements and a context storage for storing thread contexts, each thread context for one of a plurality of concurrent threads, each implementing a dataflow graph comprising an identified operation; and a hardware processor configured for configuring the at reconfigurable processing grid for: executing a first thread of the plurality of concurrent threads; and while executing the first thread: storing a runtime context value of the first thread in the context storage; while waiting for completion of the identified operation by identified logical elements, executing the identified operation of a second thread by the identified logical element; and when execution of the identified operation of the first thread completes: retrieving the runtime context value of the first thread from the context storage; and executing another operation of the first thread.

30 Claims, 8 Drawing Sheets

EXECUTING CONCURRENT THREADS ON A RECONFIGURABLE PROCESSING GRID

FIELD AND BACKGROUND OF THE INVENTION

Some embodiments described in the present disclosure relate to a reconfigurable processing grid and, more specifically, but not exclusively, to executing one or more dataflow graphs on a reconfigurable processing grid.

As used herewithin, the term reconfigurable processing grid refers to processing circuitry comprising a plurality of reconfigurable logical elements connected by a plurality of reconfigurable data routing junctions where the plurality of reconfigurable logical elements and additionally or alternatively the plurality of reconfigurable data routing junctions may be manipulated, in each of one or more iterations, to execute one or more operations. As used herewithin, the term dataflow means a computer-programming paradigm that models at least part of a software program as a directed graph of data (a dataflow graph) flowing between operations such that a series of operations is applied to each data element in a sequence of data elements of the dataflow graph. Optionally, a dataflow graph comprises a plurality of nodes, each applying an operation to a data element, and a plurality of directed edges, each connecting two of the plurality of nodes and indicative of a flow of data between the two nodes. In the field of computer science, a thread of execution is a sequence of computer instructions that can be managed independently by a scheduler. For brevity, the term "thread" is used to mean "a thread of execution" and the terms are uses interchangeably herewithin. A thread may implement a dataflow graph. As used herewithin, the term "projection" refers to a process of manipulating one or more reconfigurable logical elements of a reconfigurable processing grid, and additionally or alternatively manipulating one or more reconfigurable data routing junctions of the reconfigurable processing grid, to execute a dataflow graph. Thus, projecting a thread implementing a dataflow graph onto a reconfigurable processing grid refers to configuring the reconfigurable processing grid by manipulating one or more reconfigurable logical elements of the reconfigurable processing grid, and additionally or alternatively manipulating one or more reconfigurable data routing junctions of the reconfigurable processing grid, to execute the dataflow graph that is implemented by the thread.

In the field of computer science, concurrent computing refers to executing multiple threads of execution of a software program simultaneously. Executing multiple threads of a software program simultaneously allows increasing the overall performance and responsiveness of a system. Metrics used to measure a system's performance include, but are not limited to, an amount of tasks executed by the system in an identified amount of time (throughput), an amount of time to complete execution of a task (latency) and an amount of computer memory used by the system when operating. Concurrent computing may be used to increase throughput and reduce latency of a system.

It may be that each of a plurality of concurrent threads comprises one or more identified operations. When executing a plurality of concurrent threads simultaneously on a reconfigurable processing grid, each concurrent thread of the plurality of concurrent threads is projected onto part of the reconfigurable processing grid, i.e. some of a plurality of logical elements of the reconfigurable processing grid are manipulated to execute the concurrent thread, for example to execute a dataflow graph implemented by the concurrent thread.

There exist computer instructions whose latency for completion is inconsistent. Such an operation may require a different amount of time to execute when executed more than once, and additionally or alternatively may require more time to complete than other instructions. Some examples of such inconsistent latency operations include, but are not limited to, memory access, access to a peripheral device and executing a compute kernel.

SUMMARY OF THE INVENTION

It is an object of some embodiments described in the present disclosure to provide a system and a method for executing a plurality of concurrent threads by storing in a context storage a plurality of thread contexts, each for one of the plurality of concurrent threads, and using the context storage to manage execution of the plurality of concurrent threads on a reconfigurable processing grid. Optionally, one or more logical elements manipulated to execute an identified operation of a first thread are used to execute the identified operation of a second thread while the first thread is pending completion of the identified operation thereof, without reconfiguring the one or more logical elements to execute the identified operation of the second thread. Optionally, the identified operation has an inconsistent latency.

The foregoing and other objects are achieved by the features of the independent claims. Further implementation forms are apparent from the dependent claims, the description and the figures.

According to a first aspect, a system for processing a plurality of concurrent threads comprises: at least one reconfigurable processing grid, comprising a plurality of logical elements and a context storage, configured for storing a plurality of thread contexts, each thread context for one of a plurality of concurrent threads, each concurrent thread implementing a dataflow graph comprising a plurality of operations comprising at least one identified operation, where each of the plurality of thread contexts comprises for the concurrent thread thereof at least one runtime context value of the dataflow graph implemented thereby; and at least one hardware processor configured for configuring the at least one reconfigurable processing grid for: executing a first thread of the plurality of concurrent threads; and while executing the first thread: storing the at least one runtime context value of the first thread in the context storage; while waiting for completion of execution of the at least one identified operation of the plurality of operations of the first thread by at least one identified logical element of the plurality of logical elements, executing the at least one identified operation of a second thread of the plurality of threads by the at least one identified logical element; and when execution of the at least one identified operation of the first thread completes: retrieving the at least one runtime context value of the first thread from the context storage; and executing at least one other operation of the plurality of operations of the first thread. Storing in a context storage a thread context for each of the plurality of concurrent threads enables pausing and resuming execution of one or more of the plurality of concurrent threads without manipulating the processing grid, thus reducing complexity of reducing an amount of time the one or more identified logical elements are idle, waiting for execution of the one or more operations of the first thread to complete. This facilitates an increase of a system's throughput and reduction of the system's latency when performing one or more tasks thereof.

According to a second aspect, a method for processing a plurality of concurrent threads comprises: executing a first thread of a plurality of concurrent threads, each concurrent thread implementing a dataflow graph comprising a plurality of operations comprising at least one identified operation; and while executing the first thread: storing in a context storage, where the context storage is configured for storing a plurality of thread contexts, each thread context for one of the plurality of concurrent threads, where each of the plurality of thread contexts comprises for the concurrent thread thereof at least one runtime context value of the dataflow graph implemented thereby, the at least one runtime context value of the dataflow graph implemented by the first thread; while waiting for completion of execution of the at least one identified operation of the plurality of operations of the first thread by at least one identified logical element of a plurality of logical elements, executing the at least one identified operation of a second thread of the plurality of threads by the at least one identified logical element; and when execution of the at least one identified operation of the first thread completes: retrieving the at least one runtime context value of the first thread from the context storage; and executing at least one other operation of the plurality of operations of the first thread.

According to a third aspect, a software program product for executing a plurality of concurrent threads comprises: a non-transitory computer readable storage medium; first program instructions for executing a first thread of a plurality of concurrent threads, each concurrent thread implementing a dataflow graph comprising a plurality of operations comprising at least one identified operation; and second program instructions for: while executing the first thread: storing in a context storage, where the context storage is configured for storing a plurality of thread contexts, each thread context for one of the plurality of concurrent threads, where each of the plurality of thread contexts comprises for the concurrent thread thereof at least one runtime context value of the dataflow graph implemented thereby, the at least one runtime context value of the dataflow graph implemented by the first thread; while waiting for completion of execution of the at least one identified operation of the plurality of operations of the first thread by at least one identified logical element of a plurality of logical elements, executing the at least one identified operation of a second thread of the plurality of threads by the at least one identified logical element; and when execution of the at least one identified operation of the first thread completes: retrieving the at least one runtime context value of the first thread from the context storage; and executing at least one other operation of the plurality of operations of the first thread; wherein the first and second program instructions are executed by at least one computerized processor from the non-transitory computer readable storage medium.

With reference to the first and second aspects, in a first possible implementation of the first and second aspects the context storage comprises a plurality of context entries, each for storing a plurality of runtime context values of one of the plurality of thread contexts. Using a context entry to store a plurality of runtime context values of one of the plurality of thread contexts allows restoring each thread of the plurality of threads independently of other threads, increasing flexibility in usage of the one or more identified logical elements and thus reducing an amount of time the one or more identified logical elements are idle, waiting for execution of the one or more operations of the first thread to complete.

With reference to the first and second aspects, or the first implementation of the first and second aspects, in a second possible implementation of the first and second aspects for at least one thread of the plurality of concurrent threads, the plurality of runtime context values of the at least one thread is stored in more than one context entry of the plurality of context entries. Using more than one context entry to store the plurality of runtime context values of one thread allows a thread to have a large context that has an amount of runtime context values that does not fit in a single entry, increasing usability of the system compared to storing the plurality of runtime context values of a thread in a single entry. Optionally, the plurality of context entries is organized in a table having a plurality of rows, one for each of the plurality of context entries. Optionally, each row of the plurality of rows has a plurality of columns, such that each of the plurality of runtime context values of the thread context stored in the row is stored in a column of the plurality of columns. Organizing the plurality of context entries in a table increases ease of use of the plurality of context entries, allowing reference to a value by an index number of an entry and additionally or alternatively by an index number of a column. Optionally, the at least one reconfigurable processing grid is further configured for, while executing the first thread: storing the at least one runtime context value of the first thread in at least one identified column of the context storage; and storing at least one other runtime context value of the first thread in the at least one identified column of the context storage. Reusing a context entry allows reducing an amount of storage needed to implement a context storage, reducing cost of implementation. Optionally, the dataflow graph comprises a plurality of nodes and a plurality of edges. Optionally, at least one node of the plurality of nodes implements a lookup-table and configuring the at least one reconfigurable processing grid for executing the first thread comprises storing the lookup table in at least one other column of the plurality of columns. Storing a lookup table in one or more columns of the context storage allows faster access to a value of the lookup table than implementing in application memory, reducing an amount of time for a thread to access a value in a lookup table, and additionally or alternatively reducing an amount of time for creating a context for a thread when a context value is driven from a lookup table.

With reference to the first and second aspects, or the first implementation of the first and second aspects, in a third possible implementation of the first and second aspects the at least one reconfigurable processing grid is further configured for when execution of the at least one identified operation of the first thread completes: storing in a context entry of the plurality of context entries, where the context entry is for storing at least part of the thread context of the first thread, at least one outcome value that is an outcome of executing the at least one identified operation of the first thread. Storing an outcome value in a context entry increases accuracy of a context of a thread when resumed after execution of the one or more identified operations completes.

With reference to the first and second aspects, or the first implementation of the first and second aspects, in a fourth possible implementation of the first and second aspects a first context entry of the plurality of context entries stores a plurality of runtime context values of the first thread, and the at least one reconfigurable processing grid is further configured for: computing an identification that the first context is complete according to an outcome of at least one test applied to the plurality of runtime context values of the first context entry, and retrieving the at least one runtime context value of the first thread and executing the at least one other operation subject to the identification that the first context is complete. Optionally, the at least one reconfigurable processing grid further comprises dispatching circuitry for applying the at least one test to the plurality of runtime context values. Optionally, applying the at least one test to the plurality of runtime context values comprises the dispatching circuitry executing a set of testing instructions. Using dispatching circuitry that executes a set of testing instructions allows implementing more than one test by executing a different set of testing instructions for each test, facilitating increasing accuracy of the outcome of applying the one or more tests and thus increasing accuracy of the identification that the first context is complete. Optionally, the first context entry comprises a plurality of validity bits, each associated with one of the plurality of runtime context values; and applying the at least one test to the plurality of runtime context values comprises applying an identified bitwise mask to the plurality of validity bits. Applying a bitwise mask to the plurality of validity bits reduces an amount of time required to check a plurality of validity values of the plurality of runtime context values. Optionally, the at least one reconfigurable processing grid is further configured for selecting the first thread for executing the at least one other operation of the plurality of operations thereof according to a dispatch policy. Selecting the first thread by the one or more reconfigurable processing grids reduces latency until execution of the one or more other operations compared to selecting the first thread by processing circuitry external to the processing grid, for example when the one or more hardware processors are not part of the one or more processing grids. Optionally, the at least one reconfigurable processing grid is further configured for computing another identification that at least one other context is complete according to at least one other outcome of applying the at least one test to at least one other plurality of runtime context values of the at least one other context entry, before selecting the first thread. Identifying that one or more other context is complete before selecting the first thread allows flexibility in selecting which thread to execute, for example another thread whose context is the one or more other context, facilitating improving overall system performance compared to being limited to selecting only the first thread. Optionally, the at least one reconfigurable processing grid is further configured for: subject to a mark added to one or more context entries of the plurality of context entries, where the one or more context entries are for storing at least part of the thread context of the first thread, executing at least one of: declining to execute the at least one other operation of the plurality of operations of the first thread; and providing at least one of the plurality of thread context values of the first thread to at least one other software object. Using a mark allows flexibility in selecting which thread to execute and by whom, facilitating improving overall system performance compared to being limited to resuming execution of the first thread and terminating the thread after it was resumed.

With reference to the first and second aspects, in a fifth possible implementation of the first and second aspects the dataflow graph comprises a plurality of nodes and a plurality of edges. Optionally, the at least one identified operation is represented in the dataflow graph by at least one identified node of the plurality of nodes. Optionally, the at least one hardware processor is further configured for identifying in the dataflow graph a sub-graph (residual sub-graph) such that the residual sub-graph consists of a subset of nodes of the plurality of nodes and a subset of edges of the plurality of edges, where no path exists in the dataflow graph between any two of the at least one identified node, where for each node of the subset of nodes no path exists in the dataflow graph between the at least one identified node and the node, and where for each edge of the subset of edges no path exists in the dataflow graph between the at least one identified node and the edge, and the at least one runtime context value is at least one edge value of at least one of the subset of edges. Using as a context of a flow a residual sub-graph where no path exists in the dataflow graph between the one or more identified nodes and any node in the residual sub-graph increases accuracy of the context when execution of the one or more identified operations completes, as execution of other parts of the dataflow graph that are not part of the residual sub-graph do not effect execution of the residual sub-graph and vice versa. Optionally, the dataflow graph is a directed graph. Optionally, each of the plurality edges has a head node of the plurality of nodes and a tail node of the plurality of nodes, the subset of nodes comprises one or more entry nodes such that each of the one or more entry nodes is an entry node of the residual sub-graph where the entry node is not a head node of any of the subset of edges, and the at least one runtime context value is at least one input value of at least one of the one or more entry nodes.

With reference to the first and second aspects, in a sixth possible implementation of the first and second aspects the at least one identified operation comprises at least one of: a memory access operation, a floating-point mathematical operation, executing another computation-graph, an access to a co-processor, and an access to a peripheral device connected to the at least one reconfigurable processing grid.

With reference to the first and second aspects, in a seventh possible implementation of the first and second aspects the plurality of concurrent threads is a subset of a set of concurrent threads, each of the set of concurrent threads implementing the dataflow graph. Optionally, the system further comprises a buffer storage, for storing another plurality of thread contexts, each for at least one of the set of concurrent threads. Optionally, the at least one hardware processor is further configured for further configuring the at least one reconfigurable processing grid for: storing in the buffer storage one or more additional runtime context values of one or more waiting threads, where the one or more waiting threads are not members of the plurality of concurrent threads; and in each of a plurality of iterations: identifying that execution of at least one additional thread of the plurality of concurrent threads has completed; for at least one of the one or more waiting threads, retrieving from the buffer storage at least one additional runtime context value thereof; and adding the at least one waiting thread to the plurality of concurrent threads for execution by the plurality of logical elements. Using a buffer storage for storing one or more additional runtime context values of waiting threads that are not members of the plurality of concurrent threads allows reusing the plurality of logical elements for executing more threads than are supported concurrently at one time by the context storage, further improving overall performance of the system in terms of reducing latency and additionally or alternatively improving throughput. Optionally, the at least one reconfigurable processing grid further comprises: registrar circuitry for the purpose of tracking the one or more waiting threads; and additional dispatching circuitry for the purpose of managing execution of the plurality of concurrent threads. Optionally, the additional dispatching circuitry is configured for: selecting the at least one waiting thread from the registrar circuitry; retrieving from the buffer storage the at least one additional runtime context value of the at least one waiting thread; and adding the at least one waiting thread to the plurality of concurrent threads for execution by the plurality of logical elements. Using registrar circuitry for tracking the one or more waiting threads and additional dispatching circuitry for managing execution of the plurality of concurrent threads reduces latency in scheduling one or more threads of the plurality of concurrent threads for execution compared to managing execution by the one or more hardware processor. Optionally, adding the at least one waiting thread to the plurality of concurrent threads comprises storing the at least one additional runtime context value of the at least one waiting thread in the context storage. Optionally, the additional dispatching circuitry is further configured for: associating each of the at least one waiting thread with a context identification value, indicative of the waiting thread's thread context in the context storage. Optionally, the additional dispatching circuitry is further configured for: in a first iteration of the plurality of iterations associating an identified context identification value with a first waiting thread of the one or more waiting threads; in a second iteration of the plurality of iterations: identifying that execution of the first waiting thread completed; and associating the identified context identification value with a second waiting thread of the one or more waiting threads. Optionally, the buffer storage comprises a plurality of buffer entries, each for storing a thread context of at least one of the one or more waiting threads. Optionally, the registrar circuitry comprises a plurality of registrar entries, each for the purpose of tracking at least one of the one or more waiting threads. Optionally, the additional dispatching circuitry is further configured for: for at least one group of waiting threads of the one or more waiting threads, generating in the buffer storage a common thread context associated with each of the at least one group of waiting threads; generating in the registrar circuitry a common registrar entry associated with each of the at least one group of waiting threads; and when selecting from the registrar circuitry a new thread of the at least one group of waiting threads as the at least one waiting thread, computing at least one private context value of the new thread. Optionally, the registrar circuitry is further configured for stalling execution of at least some of the set of concurrent threads until an amount of the one or more waiting threads exceeds a threshold value. Waiting for an amount of the one or more waiting threads to exceed a threshold value allows adding one or more waiting threads to the plurality of concurrent threads in a batch, reducing overhead of such configuration, facilitating further increase in system performance compared to executing a waiting thread when it becomes available.

With reference to the first and second aspects, in an eighth possible implementation of the first and second aspects the plurality of logical elements are a plurality of reconfigurable logical elements, organized in a plurality of computation groups, and the at least one identified logical element is a subset of the plurality of computation groups.

With reference to the first and second aspects, in a ninth possible implementation of the first and second aspects a runtime context value of the dataflow graph is an input value or an output value of a node of a plurality of nodes of the dataflow graph.

With reference to the first and second aspects, in a tenth possible implementation of the first and second aspects the at least one hardware processor is further configured for configuring the at least one reconfigurable processing grid for executing the first thread in each of a plurality of thread iterations. Optionally, the context storage comprises at least one additional context entry for storing an additional plurality of runtime context values of the dataflow graph, where the additional plurality of runtime context values are common to the plurality of thread iterations, and when execution of the at least one identified operation of the first thread completes, the reconfigurable processing grid is further configured for retrieving from the context storage at least one of the additional plurality of runtime context values. Using one or more additional context entries to store additional context values that are common to the plurality of thread iterations allows reducing the size of the context storage, reducing cost of implementation, compared to duplicating the additional context values for more than one of the plurality of thread iterations.

With reference to the first and second aspects, in an eleventh possible implementation of the first and second aspects the at least one reconfigurable processing grid further comprises at least one other context storage. Optionally, the at least one hardware processor is further configured for configuring the at least one reconfigurable processing grid for: when execution of the at least one identified operation of the first thread completes: storing at least one additional runtime context value of the first thread in the at least one other context storage; further executing the first thread; and while further executing the first thread: while waiting for completion of further execution of at least one other identified operation of the plurality of operations of the first thread by at least one other identified logical element of the plurality of logical elements, executing the at least one other identified operation of another second thread of the plurality of threads by the at least one other identified logical element. Using more than one context storage allows cascading separate scheduling for more than one unpredictable latency operation, further increasing system performance in terms of reducing latency and additionally or alternatively increasing throughput.

With reference to the first and second aspects, in a twelfth possible implementation of the first and second aspects the at least one reconfigurable processing grid further comprises at least one counter, the plurality of concurrent threads comprises a group of concurrent threads associated with the at least one counter, and the at least one runtime context value comprises at least one counter value read from the at least one counter by accessing the at least one counter. Maintaining a common counter associated with a group of concurrent threads allows providing each of the group of concurrent threads with a unique value where other context values are common, increasing accuracy of operation of the group of concurrent threads. Optionally, each of the group of concurrent threads implements an identified dataflow graph. Optionally, accessing the at least one counter comprises an atomic access comprising reading the at least one counter and incrementing the at least one counter. Optionally, the at least one counter is a sequence of counters. Optionally, incrementing the at least one counter comprises: incrementing a first counter of the sequence of counters using modular arithmetic, and incrementing a second counter, consecutive to the first counter in the sequence of counters, subject to the first counter wrapping around after being incremented. Optionally, the at least one counter is a sequence of counters and incrementing the at least one counter comprises: incrementing a first counter of the sequence of counters and subject to the first counter exceeding a maximum value: incrementing a second counter, consecutive to the first counter in the sequence of counters and at least one of: setting the first counter to a new value computed using the second counter, and setting the maximum value to another new value computed using the second counter.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments are herein described, by way of example only, with reference to the accompanying drawings. With specific reference now to the drawings in detail, it is stressed that the particulars shown are by way of example and for purposes of illustrative discussion of embodiments. In this regard, the description taken with the drawings makes apparent to those skilled in the art how embodiments may be practiced.

DESCRIPTION OF SPECIFIC EMBODIMENTS OF THE INVENTION

Figure 1:
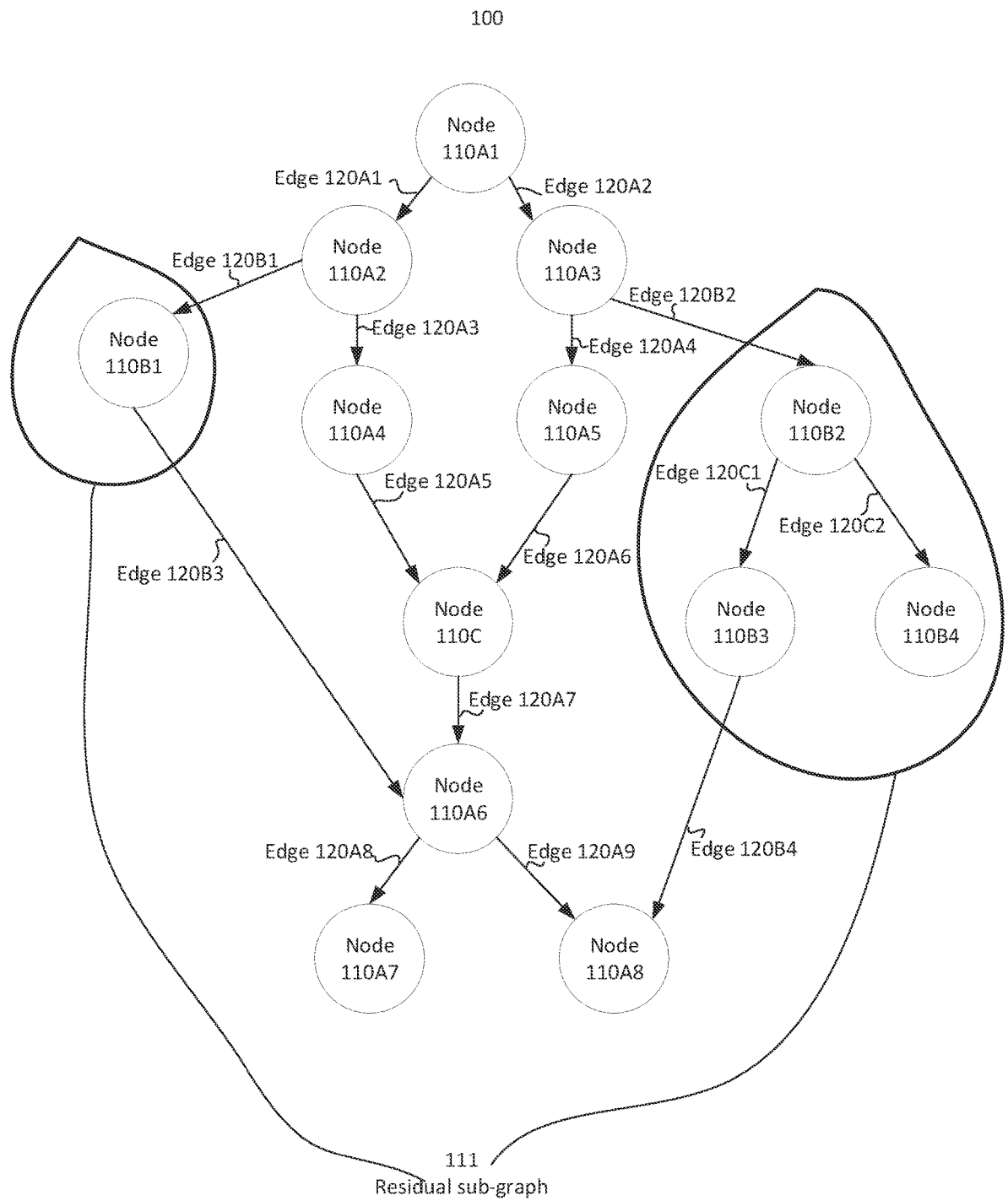
FIG. 1 is a schematic block diagram of an exemplary dataflow graph, according to some embodiments.

In the field of computer programming, the term "context" refers to a state that exists when executing an operation. With regards to a thread, a thread's context is a set of values accessible by the thread when executing an operation. When the thread is executed by a central processing unit (CPU), the thread's context includes, among other values, a plurality of values of a plurality of registers of the CPU, one or more values of a Thread Local Storage (TLS), a plurality of values of a stack memory and a program counter value.

When a first thread includes an operation having an inconsistent latency, the CPU may remain idle while waiting for the operation to complete. To increase performance of the system executing the thread, it is common practice to configure the CPU to execute a second thread while pending completion of the operation of a first thread. There exist methods to store a thread's context when the thread is suspended from being executed by the CPU and to restore the thread's context when its execution by the CPU is resumed. When the thread is executed by a CPU, values accessible to the thread reside in registers of the CPU or are accessible via an address bus. Thus, a context of a thread executed by a CPU is determined by the resources available in the CPU, and are usually similar for all threads executed by the CPU. Regardless of the functionality of the thread, the thread's context includes values for an identified set of registers and an identified size of stack memory.

As demand for high performance computerized systems that provide high throughput and low latency increases, there is an increasing use of massively parallel programing paradigms when implementing software applications. In such programming paradigms, a large program is divided into a plurality of smaller problems that can be solved in parallel, each solved separately without considerable dependence on data and additionally or alternatively on control between the plurality of smaller problems. A software program (program) may include one or more such parallel regions, where execution of the program is split from one thread executing in sequence (serially) into a plurality of concurrent threads, each executing a task that solves a smaller problem. This is also known as a fork operation. When the plurality of concurrent threads complete, execution of the program is returned to one thread executing in serial. This process is known as joining the plurality of concurrent threads into one serial thread.

While there is no exact threshold amount of concurrent threads that determines when a computation becomes massively parallel, for a given system there exist amounts of concurrent threads for which generation of thread and process contexts and additionally or alternatively execution of the concurrent threads (for example where there are more concurrent threads than processing circuitries) requires significant processing resources in terms of memory and computation time, increasing overhead of executing the program.

One existing solution to reduce overhead of context switching is the use of dataflow graphs when implementing distributed methods, for example in a distributed implementation of executing a loop. Using a plurality of concurrent threads, each implementing a dataflow graph, allows projecting each of the plurality of concurrent threads to part of a reconfigurable processing grid (processing grid) to be executed simultaneously. In addition, as the plurality of concurrent threads implement a common dataflow graph each thread executed using the thread's data, one projection of the dataflow graph to the processing grid may be used to execute more than one of the plurality of concurrent threads, in a pipeline, providing the dataflow graph for each thread input data of the thread. Use of dataflow graphs in a processing grid allows scaling distributed processing to a greater degree than is possible using a plurality of CPUs, at least in part because of the pipeline nature of executing at least some of the plurality of concurrent threads on a projection of the dataflow graph in the processing grid. However, a system may comprise more threads than can be executed simultaneously on a processing grid.

Additionally, the pipeline nature of dataflow graph execution is such that when a dataflow graph includes an operation having an inconsistent latency (inconsistent latency operation), execution of other parts of the dataflow graph are stalled while waiting for the inconsistent latency operation to complete for a thread of the plurality of concurrent threads. Such other parts may include at least some threads of the plurality of concurrent threads that are executed by the projection of the dataflow graph on the processing grid. As a result, execution of one or more of the at least some threads may be delayed, reducing throughput of the system, while at the same time processing resources (in the processing grid) are idle.

In addition, when a thread implementing a dataflow graph is projected to a processing grid, values accessible to the thread may be located in any logical element of the processing grid and are determined by the projection of the thread. When a dataflow graph includes an operation having an inconsistent latency (inconsistent latency operation), the one or more logical elements that were manipulated to execute the thread cannot be reused to execute another thread that implements another dataflow graph without being manipulated again. Usually the amount of time to wait for an inconsistent latency operation of a first thread to complete is sufficient to execute a second thread, but not sufficient to reconfigure the processing grid, execute the second thread, and reconfigure the processing grid again to resume execution of the first thread. As a result, execution of the second thread may be delayed, reducing throughput of the system, while at the same time processing resources (in the processing grid) are idle.

The present disclosure, in at least some embodiments thereof, addresses the technical problem of reducing the amount of time processing resources in the processing grid are idle, for example while waiting for execution of an inconsistent latency operation to complete, in particular when executing in a pipeline a plurality of concurrent threads that implement a dataflow graph comprising one or more identified operations. By mitigating an amount of time processing resources in the processing grid are idle, at least some embodiments described herewithin improve a system's performance, for example reduce the system's latency and additionally or alternatively increase the system's throughput, compared to standard approaches for executing a plurality of concurrent threads on a processing grid.

To do so the present disclosure proposes, in some embodiments thereof, storing in a context storage a thread context for each of the plurality of concurrent threads and using the context storage to pause and resume execution of one or more of the plurality of concurrent threads without manipulating the processing grid.

Unless otherwise noted, for brevity henceforth the term "context" is used to mean "thread context" and the terms are used interchangeably. Optionally, a thread context comprises a set of values, each an input value into a node of the dataflow graph or an output value of a node of the dataflow graph. In such embodiments, the present disclosure proposes storing in the context storage one or more runtime context values of a first thread executing a dataflow graph that comprises one or more identified operations. A runtime context value of a thread is a value accessible to the thread while the thread is executing. Optionally, at least one of the one or more identified operations is an inconsistent latency operation. Optionally, while waiting for completion of execution of the one or more identified operations of the first thread by one or more identified logical elements of the plurality of logical elements of the processing grid, the present disclosure proposes executing the one or more identified operations of a second thread by the one or more identified logical elements. Optionally, the second thread is executed by the one or more identified logical elements concurrently to the first thread, in a pipeline. Thus, instead of the one or more identified logical elements remaining idle while waiting for completion of the one or more identified operations of the first thread, and additionally or alternatively the one or more logical elements remaining idle at the same time because an entire pipeline is stalled, the one or more logical elements may be used to execute the one or more identified operations of the second thread.

There is no need to reconfigure the processing grid, i.e. to manipulate the one or more identified logical elements, as they are already configured to execute the one or more identified operations. Optionally, when execution of the one or more identified operations of the first thread completes, the present disclosure proposes retrieving the one or more runtime context values of the first thread from the context storage and resuming execution of the first thread, i.e. executing one or more other operations of the first thread. Optionally, the one or more runtime context values are loaded to one or more logical elements of the processing grid prior to executing the one or more other operations. Storing the one or more runtime context values of the first thread in the context storage before executing the one or more identified operations of the second thread and retrieving the one or more runtime context values when execution of the one or more identified operations of the first thread completes allows preserving a context of the first thread such that resuming execution thereof after execution of the one or more identified operations completes is not impacted by executing the one or more identified operations of the second thread using the one or more identified logical elements. This provides the benefit of reducing an amount of time the one or more identified logical elements are idle, waiting for execution of the one or more operations of the first thread to complete, facilitating an increase of a system's throughput and reduction of the system's latency when performing one or more tasks thereof.

Optionally, the one or more identified operations are represented in the dataflow graph by one or more identified nodes of the plurality of nodes of the dataflow graph. A context of the one or more identified operations comprises a sub-graph of the dataflow graph (a residual sub-graph) that contains no paths that lead to or from the one or more identified nodes. Thus, the residual sub-graph comprises a subset of nodes of the plurality of nodes of the dataflow graph such that no path exists in the dataflow graph from the one or more identified nodes to any of the subset of nodes, and vice versa. In addition, the residual sub-graph comprises a subset of edges of the plurality of edges of the dataflow graph such that no path exists in the dataflow graph from the one or more identified nodes to any of the subset of edges, and vice versa. Using a residual sub-graph for which no path exists in the dataflow graph to or from the one or more identified nodes defines one or more context values which do not impact execution of the one or more identified operations and are not impacted by an outcome of executing the one or more identified operations, and thus allow correct restoration of values needed to resume execution of a thread after execution of the one or more identified operations completes. Furthermore, unlike threads executing on a CPU whose context comprises values associates with predefined named general purpose registers of the CPU, a thread context of a thread implementing a dataflow graph and executing on a processing grid comprises values that derive from a structure of the dataflow graph and not from a structure of the circuitry executing the thread.

Optionally, the one or more identified operations comprise more than one operation having inconsistent latency.

Optionally, the context storage comprises a plurality of context entries, each context entry of the plurality of context entries for storing a plurality of runtime context values of a thread context of one of the plurality of concurrent threads. A thread context may comprise more values than fit in one context entry. Optionally, for at least one thread of the plurality of concurrent threads, the plurality of runtime context values of the at least one thread's thread context are stored in more than one context entry of the plurality of context entries. Optionally, the plurality of context entries are organized in a table having a plurality of rows, one for each of the plurality of context entries. Optionally, the context storage is a reservation station.

Optionally, the context storage is used additionally or alternatively to store a lookup table implemented by a node of the dataflow graph implemented by the plurality of concurrent threads. Optionally, a system comprises more than one context storage, allowing separate scheduling for a sequence of identified operations. A first context storage may be used for managing reuse of a first set of identified logical elements implementing one or more first identified operations of a thread, and a second context storage may be used for managing reuse of a second set of identified logical elements implementing one or more second identified operations of the thread. This provides the benefit of additional flexibility in scheduling execution of the plurality of concurrent threads, further reducing an amount of time processing resources of the processing grid are idle compared to scheduling execution of the plurality of concurrent threads while considering the one or more first identified operations together with the one or more second identified operations.

In addition, in some embodiments thereof, the present disclosure addresses another technical problem of managing execution of a large amount of concurrent threads that exceeds the amount of threads that can be executed simultaneously by the processing grid in a given configuration thereof. In such embodiments, the plurality of concurrent threads is a subset of a set of concurrent threads, where each of the set of concurrent threads implements the dataflow graph. At least some embodiments described herewithin improve a system's performance by reducing an amount of overhead for context switching and scheduling compared to standard methods for scheduling large amounts of concurrent threads.

To do so, in some embodiments described herewithin, the present disclosure proposes storing another plurality of thread contexts in a buffer storage, one for each of the set of concurrent threads, and in each of a plurality of iterations retrieving from the buffer storage another thread context of another thread of the set of concurrent threads and using the other thread context when adding the other thread to a plurality of threads for execution by the processing grid.

Optionally, the set of concurrent threads comprises one or more waiting threads that are not members of the plurality of concurrent threads, and the other thread is a waiting thread of the one or more waiting threads. Optionally, the waiting thread is added to the plurality of concurrent threads, and execution thereof is managed using the context storage, optionally storing in the context storage the other thread context retrieved from the buffer storage. Optionally, the waiting thread is projected to the processing grid without being added to the plurality of concurrent threads, optionally loading one or more values of the other thread context to one or more other logical elements of the processing grid. Optionally, the waiting thread is selected in response to identifying that execution of at least one additional thread of the plurality of concurrent threads has completed.

Optionally, the plurality of concurrent threads are selected from the set of concurrent threads after storing the other plurality of thread contexts in the buffer storage.

Optionally, the processing grid comprises circuitry for tracking the one or more waiting threads (registrar circuitry). Optionally, the registrar circuitry comprises a plurality of registrar entries, each for tracking at least one of the one or more waiting threads. In some embodiments described herewithin, the set of concurrent threads comprises one or more groups of the waiting threads, where a group of waiting threads have a shared context. For such a group of waiting threads, the buffer storage may have a common thread context associated with each of the group of waiting threads, and the registrar circuitry may have a common registrar entry associated with each of the group of waiting threads. When the other thread is selected from a group of waiting threads, optionally one or more private context values of the other thread are generated and used when adding the other thread to the plurality of threads for execution by the processing grid.

To do so, in some embodiments described herewithin, the present disclosure proposes storing another plurality of thread contexts in a buffer storage, one for each of the set of concurrent threads, and in each of a plurality of iterations retrieving from the buffer storage another thread context of another thread of the set of concurrent threads and using the other thread context when adding the other thread to a plurality of threads for execution by the processing grid.

Optionally, a system comprises more than one buffer storage, allowing separate scheduling for more than one set of concurrent threads, implementing more than one dataflow graph. A first buffer storage may be used for managing scheduling a first set of concurrent threads, and a second buffer storage may be used for scheduling a second set of concurrent threads. This provides the benefit of additional flexibility in scheduling execution of more than one set of concurrent threads independently of each other, further reducing an amount of time processing resources of the processing grid are idle compared to scheduling execution of the one or more sets of concurrent threads as a single set of threads.

It should be noted that some embodiments according to the present disclosure address both technical problems described above, while some other embodiments address one or the other.

Before explaining at least one embodiment in detail, it is to be understood that embodiments are not necessarily limited in its application to the details of construction and the arrangement of the components and/or methods set forth in the following description and/or illustrated in the drawings and/or the Examples. Implementations described herein are capable of other embodiments or of being practiced or carried out in various ways.

Embodiments may be a system, a method, and/or a computer program product. The computer program product may include a computer readable storage medium (or media) having computer readable program instructions thereon for causing a processor to carry out aspects of the embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code, natively compiled or compiled just-in-time (JIT), written in any combination of one or more programming languages, including an object oriented programming language such as Smalltalk, C++, Java, Object-Oriented Fortran or the like, an interpreted programming language such as JavaScript, Python or the like, and conventional procedural programming languages, such as the "C" programming language, Fortran, or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), a coarse-grained reconfigurable architecture (CGRA), or programmable logic arrays (PLA) may execute the computer readable program instructions by utilizing state information of the computer readable program instructions to personalize the electronic circuitry, in order to perform aspects of embodiments.

Aspects of embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, showing a schematic block diagram of an exemplary dataflow graph 100, according to some embodiments. Optionally, dataflow graph 100 comprises a plurality of operations. Optionally, dataflow graph 100 comprises a plurality of nodes, for example comprising node 110A1, node 110A2, node 110A3, node 110A4, node 110A5, node 110A6, node 110A7, node 110A8, node 110B1, node 110B2, node 110B3, node 110B4, and one or more identified nodes 110C, referred collectively as plurality of nodes 110. Optionally, dataflow graph 100 comprises a plurality of edges, for example edge 120A1, edge 120A2, edge 120A3, edge 120A4, edge 120A5, edge 120A6, edge 120A7, edge 120A8, edge 120A9, edge 120B1, edge 120B2, edge 120B3, edge 120B4, edge 120C1, and edge 120C2, referred to collectively as plurality of edges 120. Optionally, each of the plurality of edges 120 is a directional edge connecting two of the plurality of nodes 110 and having a head node and a tail node. For example, node 110A2 is the tail node of edge 120B1 and node 110B1 is the head node of edge 120B1.

Optionally, the plurality of operations comprises one or more identified operations. Optionally, one or more nodes 110C implement the one or more identified operations. Optionally, the one or more identified operations have an inconsistent latency. Some examples of an operation having inconsistent latency include, but are not limited to, a memory access operation, a floating-point mathematical operation, executing another computation graph, an access to a co-processor, and an access to a peripheral device connected to the processing grid. Some examples of a co-processor include a tensor core unit and a graphical processing unit.

A context of dataflow graph 100 with regards to the one or more identified operations comprises values of a residual sub-graph that optionally comprises a subset of nodes of plurality of nodes 110 where no path exists in dataflow graph 100 between any two of one or more identified nodes 110C and for each node of the subset of nodes no path exists in dataflow graph 100 between the node and one or more identified nodes 110C. Optionally, the residual sub-graph comprises a subset of edges of the plurality of edges 120 where for each edge of the subset of edges no path exists in dataflow graph 100 between the edge and the one or more identified nodes 110C. In this example, residual sub-graph 111 comprises a subset of nodes comprising node 110B1, node 110B2, node 110B3 and node 110B4, collectively referred to as subset of nodes 110B. In this example, no path exists in dataflow graph 100 between one or more identified nodes 110C and any of node 110B1, node 110B2, node 110B3 and node 110B4. Further in this example, residual sub-graph 111 comprises a subset of edges comprising edge 120C1 and edge 120C2, collectively referred to as subset of edges 120C. In this example, no path exists in dataflow graph 100 between one or more identified nodes 110C and any of edge 120C1 and edge 120C2.

Optionally, a runtime context value of dataflow graph 100 is an input value of a node of the plurality of nodes 120, for example an input value of node 110A2 or of node 110B3. Optionally, a runtime context value of dataflow graph 100 is an input value of a node of residual graph 111, for example an input value of node 110B2 or a value of edge 120B2.

Optionally, a runtime context value of dataflow graph 100 is an output value of a node of the plurality of nodes 120, for example an output value of node 110B2 or a value of edge 120C1. Optionally, a runtime context value of dataflow graph 100 is an output value of a node of residual graph 111, for example an output value of node 110B3 or a value of edge 120B4. Optionally, a runtime context value of dataflow graph 100 is an output value of one or more identified nodes 110C.

In an embodiment, a context of dataflow graph 100 with regards to the one or more identified operations comprises a value of edge 120B1, a value of edge 120B2 and a value of edge 120A7. In another embodiment, the context of dataflow graph 100 with regards to the one or more identified operations comprises a value of edge 120B3, a value of edge 120B4 and a value of edge 120A7. In another embodiment, the context of dataflow graph 100 with regards to the one or more identified operations comprises a value of edge 120B3, a value of edge 120C1, a value of edge 120C2, and a value of edge 120A7.

An entry node into a graph is a node that is not a head node of any edge of the graph. Optionally, a context of dataflow graph 100 with regards to the one or more identified operation comprises only entry nodes into residual sub-graph and output values of the one or more identified nodes. In this example, such a context comprises a value of edge 120B1 (or an input value of node 110B1), a value of edge 120B2 (or an input value of node 110B2) and a value of edge 120A7.

In some embodiments, a system executes a plurality of concurrent threads that each implement dataflow graph 100.

Figure 2:
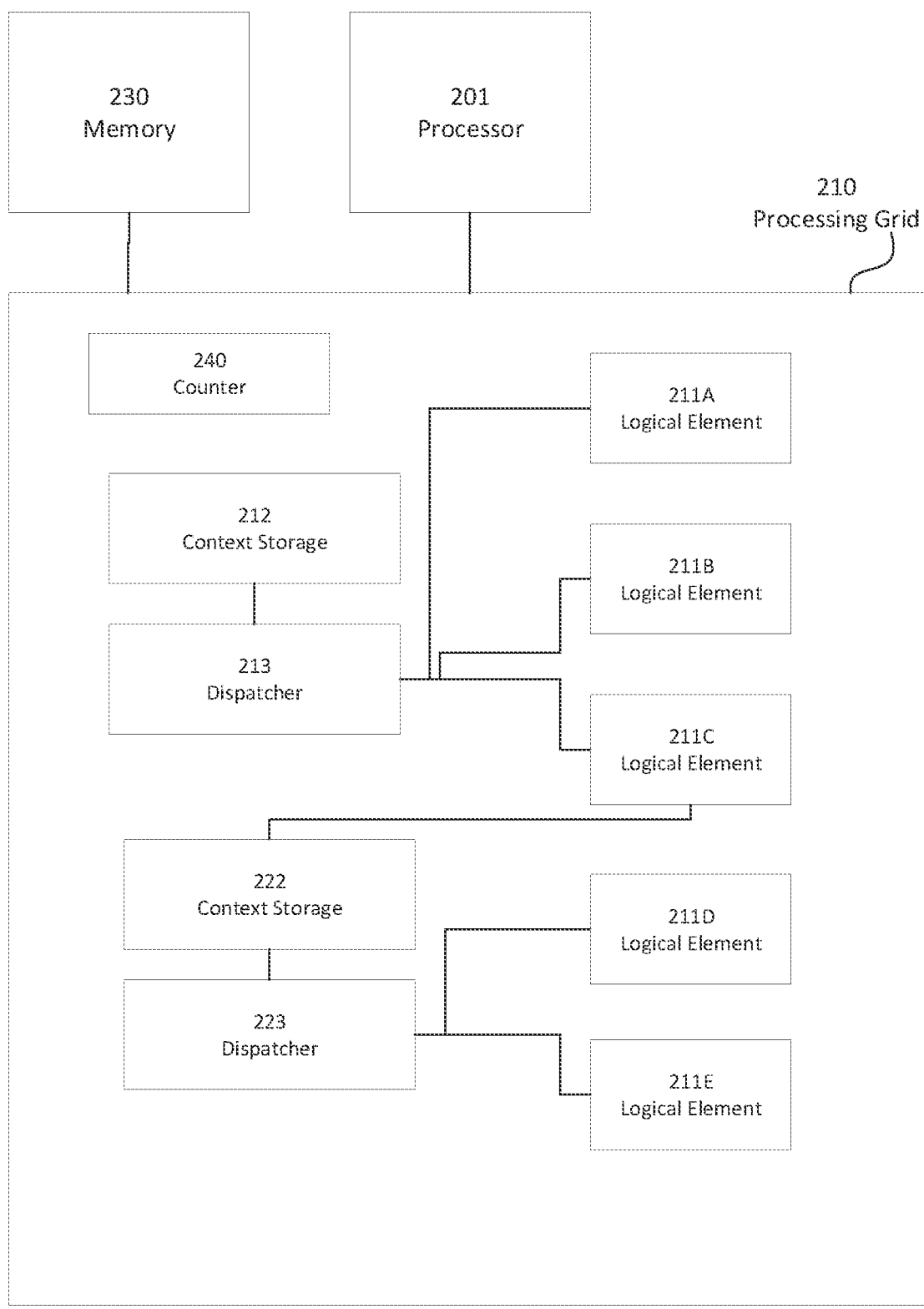
FIG. 2 is a schematic block diagram of an exemplary system, according to some embodiments.

Reference is now made also to FIG. 2, showing a schematic block diagram of an exemplary system 200, according to some embodiments. In such embodiments, at least one hardware processor 201 is connected to at least one reconfigurable processing grid 210.

For brevity, henceforth the term "processing unit" is used to mean "at least one hardware processor" and the terms are used interchangeably. The processing unit may be any kind of programmable or non-programmable circuitry that is configured to carry out the operations described below. The processing unit may comprise hardware as well as software. For example, the processing unit may comprise one or more processors and a transitory or non-transitory memory that carries a program which causes the processing unit to perform the respective operations when the program is executed by the one or more processors.

In addition, for brevity henceforth the term "processing grid" is used to mean "at least one reconfigurable processing grid" and the terms are used interchangeably. Optionally, an interconnected processing grid comprises a plurality of reconfigurable logical elements connected by a plurality of configurable data routing junctions. An example of a reconfigurable logical element is processing circuitry that may be manipulated to perform one of an identified set of mathematical and logical operations. Some examples of a mathematical operation are addition and subtraction. Some examples of a logical operation are a logical NOT operation and a logical AND operation. Optionally, processing grid 210 comprises a plurality of logical elements comprising logical element 211A, logical element 211B, logical element 211C, logical element 211D, and logical element 211E, collectively referred to as plurality of logical elements 211. Optionally, plurality of logical elements 211 is a plurality of reconfigurable logical elements. Optionally, plurality of logical elements 211 is organized in a plurality of computation groups.

Optionally, processing grid 210 comprises one or more context storage, for example context storage 212 and additionally or alternatively other context storage 222. Optionally, context storage 212 is configured for storing a plurality of thread contexts, each thread context for one of the plurality of concurrent threads. Optionally, each thread context of the plurality of thread contexts comprises, for the concurrent thread thereof, one or more runtime context values of the dataflow graph implemented by the concurrent thread. For example, each thread context may include a value of edge 120B1 for the thread thereof. Optionally, context storage 212 is a reservation station. Optionally, other context storage 222 is a reservation station.

Figure 3:
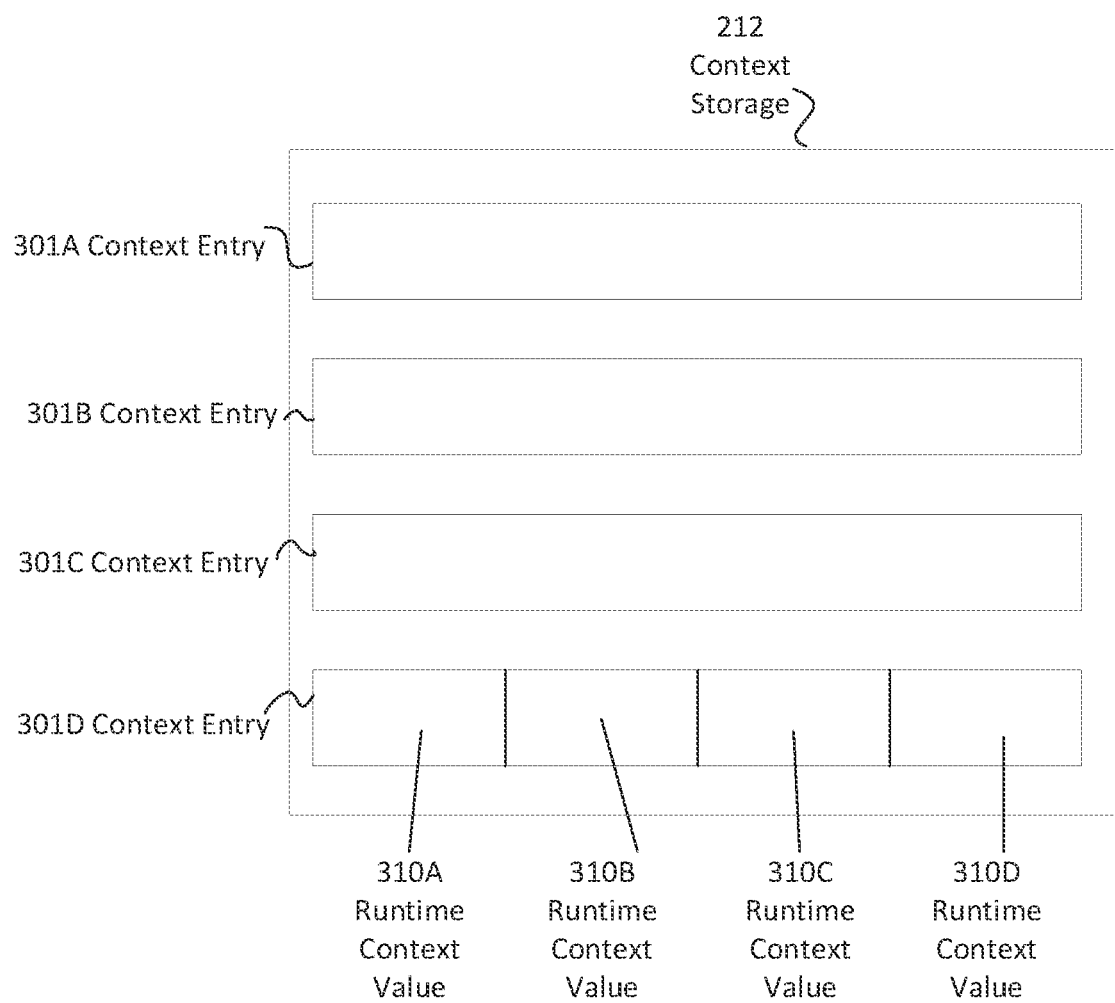
FIG. 3 is a schematic block diagram of an exemplary context storage, according to some embodiments.

Reference is now made also to FIG. 3, showing a schematic block diagram of an exemplary context storage 212, according to some embodiments. In such embodiments, context storage comprises a plurality of context entries comprising, for example, context entry 301A, context entry 301B, context entry 301C and context entry 301D, collectively referred to as plurality of context entries 301. Optionally, each of the plurality of context entries 301 is for storing a plurality of runtime context values of one of the plurality of thread contexts. For example, context entry 301D may be for storing a first thread context of a first thread of the plurality of concurrent threads. Optionally, the plurality of runtime context values of the first thread comprises runtime context value 310A, runtime context value 310B, runtime context value 310C and runtime context value 310D, collectively referred to as plurality of runtime context values 310. Optionally, context entry 301C is for storing a second thread context of a second thread of the plurality of concurrent threads. Optionally, the plurality of runtime context values of at least one thread context of at least one thread is stored in more than one context entry of the plurality of context entries 301.

Optionally, the plurality of context entries 301 is organized in a table. Optionally, the table has a plurality of rows. Optionally, each of the plurality of context entries 301 has a row in the plurality of rows. Optionally, each row of the plurality of rows has a plurality of columns. Optionally, each of the plurality of runtime context values 310 is stored in a column of the plurality of columns of the row for storing context entry 301D.

Reference is now made again to FIG. 2. Optionally, context storage 212 is implemented in a memory area of processing grid 210. Optionally, context storage 212 is implemented in one or more memory component 230 connected to processing grid 210. Optionally, part of context storage 212 is implemented in the memory area of processing grid 210 and another part of context storage 212 is implemented in one or more memory component 230. Similarly, other context storage 222 may be implemented fully or in part in one or more of another memory area of processing grid 210 and one or more memory components 230.

Optionally, processing grid 210 comprises dispatching circuitry 213, optionally connected to context storage 212. Optionally, dispatching circuitry 213 is used to compute an identification that a context of the plurality of contexts is complete. A context of a thread is complete when the thread's processing may continue from a point where said processing was suspended, for example waiting for an inconsistent latency operation to complete. Optionally, dispatching circuitry 213 is used to configure one or more logical elements of plurality of logical elements 211 to execute one or more threads of the plurality of concurrent threads, optionally by loading one or more runtime context values of the one or more threads retrieved from context storage 212 to the one or more logical elements. Optionally, dispatcher circuitry 213 is implemented in hardware. Optionally, dispatcher circuitry 213 executes a set of dispatcher computer instructions. Optionally, the set of dispatcher computer instructions comprises a set of testing instructions.

Similarly, processing grid 210 optionally comprises another dispatcher circuitry 223, optionally connected to other context storage 222, optionally for managing execution of the plurality of concurrent threads using other context storage 222.

Optionally, processing grid 210 comprises one or more counters 240. Optionally, the plurality of concurrent threads comprises a group of concurrent threads that is associated with the one or more counters 240. There exist implementations where a thread of the plurality of concurrent threads can identify a task to execute according to one or more counter values of the one or more counters 240. For example, when the plurality of concurrent threads implement a loop where one of the one or more counters 240 is used to count iterations of the loop. In another example, the plurality of concurrent threads implement two or more nested loops, where each of the one or more counters counts iterations of one of the two or more nested loops. One or more counter values of the one or more counters 240 may indicate which iteration of the loop to execute. Optionally, accessing the one or more counters 240 comprises an atomic access which comprises reading the one or more counters 240 and incrementing or decrementing at least one of the one or more counters 240. Thus, after a first thread accesses the one or more counters 240, at least one of the one or more counters 240 is incremented or decremented such that each thread of the plurality of concurrent threads that access the one or more counters 240 retrieves a unique combination of the one or more counter values.

Optionally, the one or more counters 240 are a sequence of counters, for example when implementing two or more nested loops. In such an implementation, a first counter of the one or more counter implements a counter of an inner loop of the two or more nested loops, and a second counter of the one or more counter 240, consecutive to the first counter in the sequence of counters, implements another counter of an outer loop of the two or more nested loops. It should be noted that the designations "first counter" and "second counter" do not refer to an absolute ordinal identifier in the sequence of counters but rather to identify two consecutive counters in the sequence of counters.

Optionally, a least one of the one or more nested loops has a target amount of iterations. For example, when the one or more counter 240 represent multiple dimensions of a set or tasks, for example an array of tasks. Optionally, incrementing the one or more counters 240 comprises incrementing the first count using modular arithmetic. Optionally, each of the one or more counters 240 has a modulus. Not all of the one or more counters 240 share a common modulus. Optionally, incrementing the one or more counters 240 comprises incrementing the second counter subject to the first counter wrapping around after being incremented. Optionally, incrementing the one or more counters 240 comprises incrementing the first counter of the sequence of counters, and subject to the first counter exceeding a maximum value, incrementing the second counter and setting the first counter to a new value computed using the second counter. Additionally or alternative, incrementing the one or more counters 240 comprises setting the maximum value to another new value computed using the second counter, for example when an inner loop starts from a value that is derived from a counter of an outer loop, for example when each iteration of the outer loop comprises executing the inner loop an amount of times that is derived using a current value of the second counter.

It should be noted that while the description above focuses on incrementing counters, similarly the first counter may be decremented and the second counter may be modified subject to the first counter being lower than a minimum value. Optionally, a counter is incremented or decremented using a stride value that is different from 1.

In some embodiments, the plurality of concurrent threads is a subset of a set of concurrent threads, each implementing dataflow graph 100. Optionally, the set of concurrent threads comprises one or more waiting threads that are not members of the plurality of concurrent threads and are pending execution.

Figure 4:
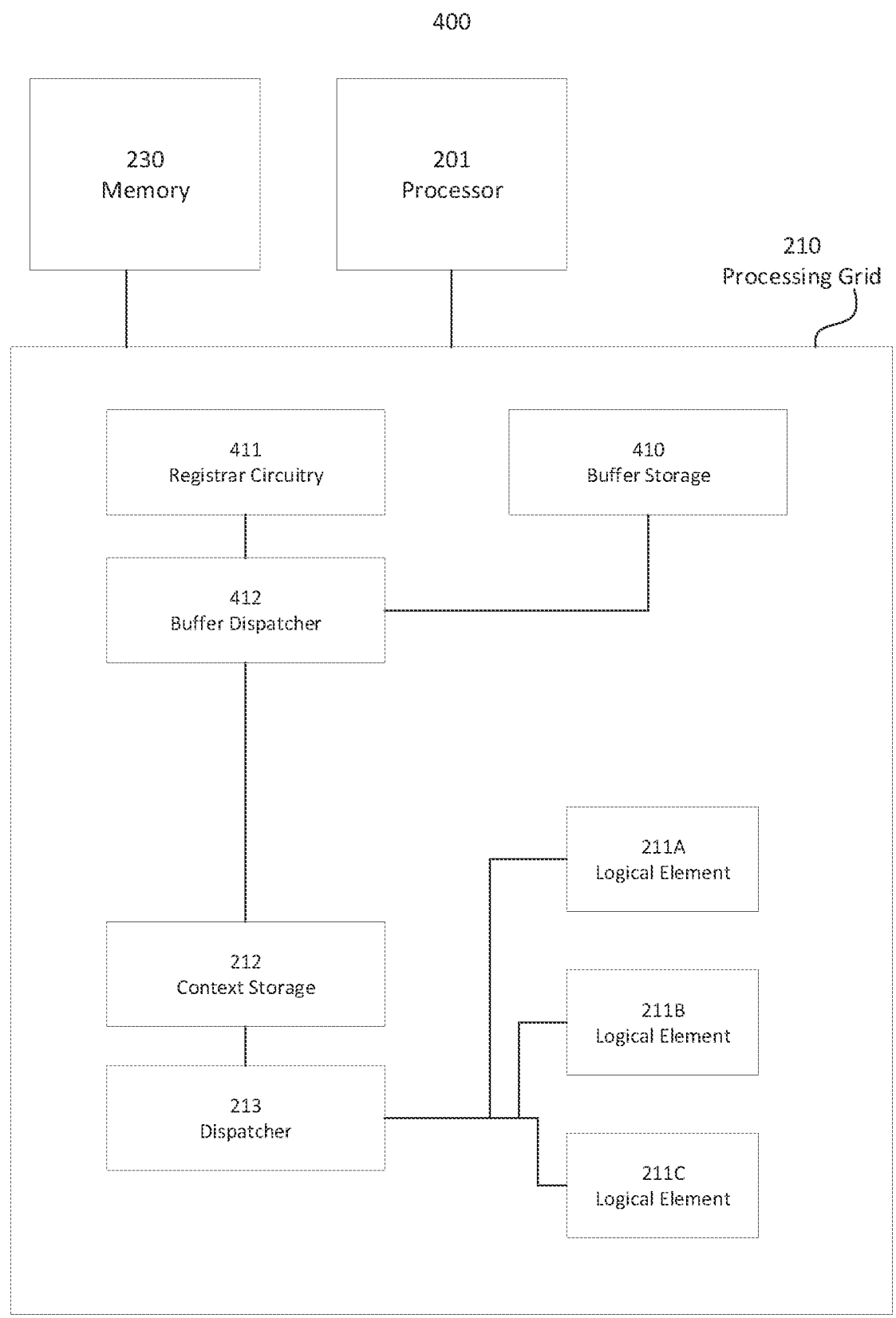
FIG. 4 is a schematic block diagram of another exemplary system, according to some embodiments.

Reference is now made also to FIG. 4, showing a schematic block diagram of another exemplary system 400, according to some embodiments. In such embodiments, processing grid 210 comprises buffer storage 410. Optionally, buffer storage 410 stores another plurality of thread contexts, each for one or more of the set of concurrent threads. Optionally, buffer storage 410 is implemented in yet another memory area of processing grid 210. Optionally, buffer storage 410 is implemented in one or more memory component 230. Optionally, buffer storage 410 comprises a plurality of buffer entries, where each of the plurality of buffer entries is for storing a thread context of at least one of the one or more waiting threads of the set of concurrent threads.

Optionally, processing grid 210 comprises registrar circuitry 411 for tracking the one or more waiting threads. Optionally, registrar circuitry 411 comprises a plurality of registrar entries, each for tracking at least one of the one or more waiting threads. Optionally, processing grid 210 comprises buffer dispatcher circuitry 412 for managing execution of the plurality of concurrent threads. Optionally, buffer dispatcher circuitry 412 is connected to buffer storage 410. Optionally, buffer dispatcher circuitry 412 is connected to registrar circuitry 411. Optionally, buffer dispatcher circuitry 412 is connected to context storage 212, optionally via one or more ingress ports (not shown).

Optionally, processing grid 210 comprises one or more buffer storages. Optionally, one or more other buffer storages store yet another plurality of thread contexts, each for one or more of one or more other sets of concurrent threads. Similarly, processing grid 210 optionally comprises one or more other buffer dispatcher circuitry, optionally connected to the one or more other buffer storage, and additionally or alternatively one or more other registrar circuitry, optionally connected to the one or more other buffer dispatcher circuitry.

In some embodiments, processing unit 201 configures processing grid 210 to execute the plurality of concurrent threads, and additionally or alternatively to execute the set of concurrent threads.

Figure 5:
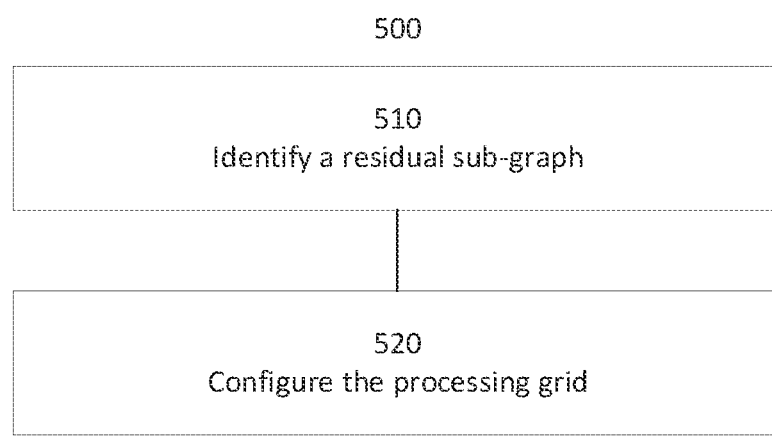
FIG. 5 is a flowchart schematically representing an optional flow of operations, according to some embodiments.

Reference is now made also to FIG. 5, showing a flowchart schematically representing an optional flow of operations 500, according to some embodiments. In such embodiments, in 510 processing unit 201 identifies residual sub-graph 111. Optionally, processing unit 201 uses residual sub-graph 111 to determine the plurality of runtime context values of each of the plurality of concurrent threads, as described above in FIG. 1.

Optionally, in 520 processing unit 201 configures processing grid 210. Optionally, configuring processing grid 210 comprises manipulating one or more of the plurality of logical elements 211. Optionally, configuring processing grid 210 comprises, but is not limited to, manipulating one or more of context storage 212, dispatcher circuitry 213, buffer storage 410, registrar 411 and buffer dispatcher circuitry 412. Optionally, configuring processing grid 210 comprises loading one or more values to one or more of context storage 212 and buffer storage 410.

Figure 6:
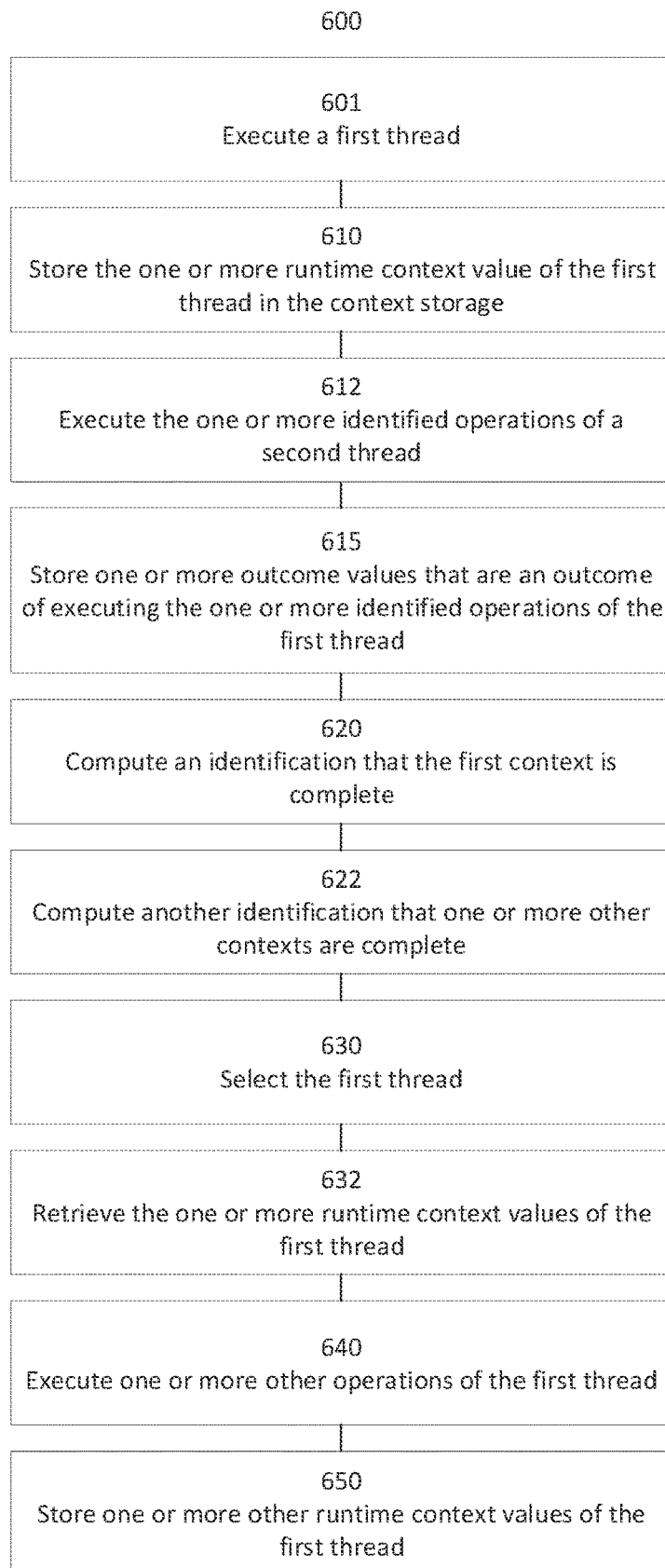
FIG. 6 is a flowchart schematically representing an optional flow of operations for a processing grid, according to some embodiments.

In some embodiments processing unit 201 configures processing grid 210 to implement one or more methods. Reference is now made also to FIG. 6, showing a flowchart schematically representing an optional flow of operations 600 for a processing grid, according to some embodiments. Optionally, processing unit 201 configures processing grid 210 to implement method 600. In such embodiments, in 601 processing grid 210 executes a first thread of the plurality of concurrent threads using at least some of the plurality of logical elements 211. Optionally, the one or more identified operations of dataflow graph 100 are executed by one or more identified logical elements of the plurality of logical elements 211, for example identified logical element 211C. Optionally, when the plurality of logical elements 211 are organized in a plurality of computation groups, the one or more identified logical elements are a subset of the plurality of computation groups. In 610, processing grid 201 optionally stores one or more runtime context values of the first thread, for example comprising runtime context value 310A in context storage 212, for example in context entry 301D. When the plurality of context entries 310 is organized in a table where context entry 301D is a row in the table, optionally processing grid 201 stores runtime context value 310A in a column of the plurality of columns of the row. Optionally, runtime context value 310A is an input value of an entry node into residual sub-graph 111, for example an input value of node 110B1. Optionally, when context entry 301D is a row in a table, processing grid 210 stores runtime context value 310A in one or more identified columns of context storage 212. Optionally, processing grid 201 stores runtime context value 310A while waiting for execution of the one or more identified operations of the first thread by identified logical element 211C to complete. Further while waiting for execution of the one or more identified operations of the first thread by identified logical element 211C to complete, in 612 processing grid 210 optionally configures the at least some logical elements to execute a second thread of the plurality of concurrent threads such that the processing grid 210 executes the one or more identified operations of the second thread by identified logical element 211C.

Optionally, when execution of the one or more identified operations of the first thread complete, in 615 processing grid 210 optionally stores in context entry 301D one or more outcome values. Optionally the one or more outcome values are an outcome of executing the one or more identified operations. For example, when the one or more identified operations comprise a memory access, the one or more outcome values may include a data value retrieved by the memory access.

In 620, processing grid 210 optionally computes an identification that context entry 301D is complete. Optionally, the identification that context entry 301D is complete is computed according to an outcome of applying one or more tests to the plurality of runtime context values 310. Optionally, the one or more tests are applied by dispatcher circuitry 213. Optionally, the dispatching circuitry executes a set of testing instructions to apply the one or more tests. Optionally, applying the one or more tests comprises checking whether the plurality of runtime context values 310 are valid. According to some embodiments, to do so context entry 301D comprises a plurality of validity bits. Optionally, each of the plurality of validity bits is associated with one of the plurality of runtime context values 310. Optionally, applying the one or more tests comprises applying an identified bitwise mask to the plurality of validity bits, where the identified bitwise mask is indicative of which of the plurality of runtime context values 310 needs to be valid in order for context entry 301D to be complete. In some embodiments, the identified bitwise mask is applied to the plurality of validity bits that describe a row of a table of context entries.

Optionally, in 630 processing grid 210 selects the first thread for executing. Optionally, processing grid 210 uses dispatcher circuitry 213 to select the first thread.

It may be that more than one thread of the plurality of concurrent threads complete executing their respective one or more identified operations. Optionally, the first thread is selected according to a dispatch policy. For example, the first thread may be a first thread found. Optionally, the dispatch policy comprises using a round robin to prevent starvation of a thread. Optionally, the dispatch policy is based on a timestamp, for example dispatching a thread that completed earliest or latest. Optionally, the dispatch policy is based on a priority value. Optionally a priority value is assigned to a thread. Optionally, the priority value is computed by the thread for itself. Optionally, the priority value determines a partial order of priority among the plurality of concurrent threads.

Optionally, in 622 processing grid 210 identifies that the more than one thread completed executing their respective one or more identified operations by computing another identifications that one or more other context entries of the plurality of context entries 301 is complete. Optionally, the other identification is computed according to one or more other outcomes of applying the one or more tests to one or more other pluralities of runtime context values of the one or more other context entries. Optionally, processing grid executes 622 before selecting the first thread in 630, for example when using a priority based dispatch policy.

In 632, processing grid 210 optionally retrieves runtime context value 310A from context storage 212. Optionally, processing grid 210 executes 632 subject to context entry 301D being complete. Optionally, processing grid 210 uses dispatcher circuitry 212 to retrieve runtime context value 310A from context storage 212. Optionally, in 640 processing grid 210 resumes execution of the first thread by executing one or more other operations of the plurality of operations of the first thread, for example one or more operations implemented in node 110A6. Optionally, processing grid loads retrieved runtime context value 310A to one or more of plurality of logical elements 211. Optionally, processing grid 210 uses dispatcher circuitry 212 to execute 640. Optionally, processing grid 210 executes 640 subject to context entry 301D being complete.

In some embodiments there may be a need to suspend execution of the first thread. Some examples include a breakpoint set for debugging. Optionally, a breakpoint is conditional based on one or more values of the plurality of runtime context values 311. Upon suspending execution of the first thread, processing grid 210 may halt execution of the first thread. Additionally or alternatively, processing grid 210 may provide context information regarding the first thread to one or more other software objects executed in system 200, some examples being a debugger and a logger. Optionally, subject to a mark added to context entry 301D, processing grid 210 declines to execute the one or more other operations of the first thread. Additionally, or alternatively, subject to the mark processing grid 210 optionally provide one or more of the plurality of runtime context values 310 to one or more other software objects. Optionally, the one or more other software objects are implemented in another part of the processing grid 210. Optionally, the one or more other software objects are executed by processing unit 201. Optionally, the one or more other software objects are executed by another processing unit connected to the processing grid 210 (not shown).

In some embodiments, a context entry may be reused. For example, when the plurality of context entries 301 is organized in a table, a column of the plurality of columns of a row in the table may be reused. In such embodiments in 650, processing grid 210 optionally stores one or more other runtime context values of the first thread in the column used to store the one or more runtime context values comprising runtime context value 310A in 610. A context entry may be reused when executing another identified operation of the first thread having an inconsistent latency. Optionally, a context entry is reused while waiting for another execution of the one or more identified operations of the first thread to complete. Optionally the first thread is executed in each of a plurality of iterations. Optionally processing grid 210 executes 610 in one of the plurality of iterations and executes 650 in another of the plurality of iterations.

In some embodiments one or more nodes of dataflow graph 100 implements a lookup-table. When the plurality of context entries 301 is organized in a table, configuring the processing grid 210 for executing the first thread optionally comprises storing the lookup-table in one or more other columns of the plurality of columns of the table, other than the one or more columns for storing runtime context value 310A. When the lookup-table is stored in the one or more other columns, the one or more other columns may be read by any of the plurality of concurrent threads but not written to.

Optionally, a thread accesses the lookup table using an instruction comprising an index of the one or more other columns and a value. Optionally, when the index identifies a column that is part of the lookup-table, the value is used as an indication of the row to access.

Optionally, processing grid 210 is further configured by processing unit 201 to execute the first thread in each of a plurality of thread iterations. In some embodiments, one or more additional context entries of the plurality of context entries 301 are used to provide at least part of a context of the first thread that is common to a plurality of thread iterations each executing the first thread. Optionally, the one or more additional context entries comprise one or more additional context values that are entry values into the residual sub-graph, for example an input value of node 110B2. Optionally, one or more other context entries provide another part of the context for the plurality of thread iterations for executing the thread, comprising one or more yet other context values that are internal to the residual sub-graph, for example a value of edge 120C2, and may be different for some of the plurality of thread iterations. Optionally, processing grid 210 is configured for, when execution of the one or more identified operations of the first thread completes, retrieving from context storage 212 at least one of the one or more additional context values, optionally for a next thread iteration for executing the first thread. Optionally, the at least one of the one or more additional context values is loaded to one or more of the plurality of logical elements 211 before other values are loaded thereof.

In some embodiments comprising more than one context storage, processing unit 201 configures the processing grid 210 to execute the following optional method.

Figure 7:
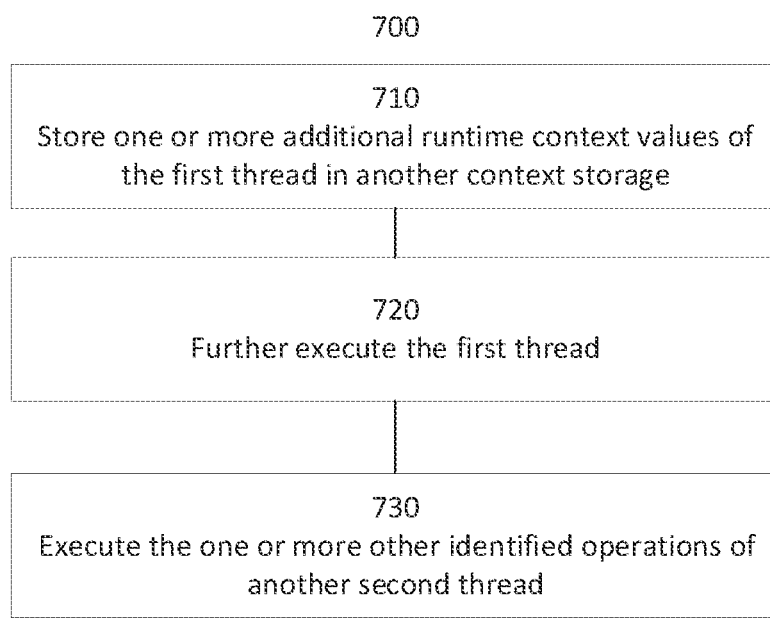
FIG. 7 is a flowchart schematically representing another optional flow of operations for a processing grid, according to some embodiments.

Reference is now made also to FIG. 7, showing a flowchart schematically representing another optional flow of operations 700 for a processing grid, according to some embodiments. In such embodiments, when execution of the one or more identified operation of the first thread completes, in 710 processing grid 210 stores one or more yet additional runtime context values of the first thread in other context storage 222. In 720 processing grid 210 optionally further executes the first thread, and while further executing the first thread in 730 processing grid 210 optionally executes one or more other identified operations of another second thread by one or more other identified logical elements, for example logical element 211E, while waiting for execution of the one or more other identified operations of the first thread by logical element 211E to complete. Optionally, processing grid 210 uses other dispatcher circuitry 223 to manage execution of the plurality of concurrent threads, using other context storage 222.

As described above, in some embodiments described herewithin the plurality of concurrent threads are a subset of a set of concurrent threads, each implementing dataflow graph 100. In such embodiments, the set of concurrent threads comprises one or more waiting threads that are not members of the plurality of concurrent threads and are pending execution. Optionally, processing grid 210 manages execution of the set of concurrent threads using buffer storage 410. Optionally, to manage execution of the set of concurrent threads, processing unit 201 configures processing grid 210 to execute the following method.

Figure 8:
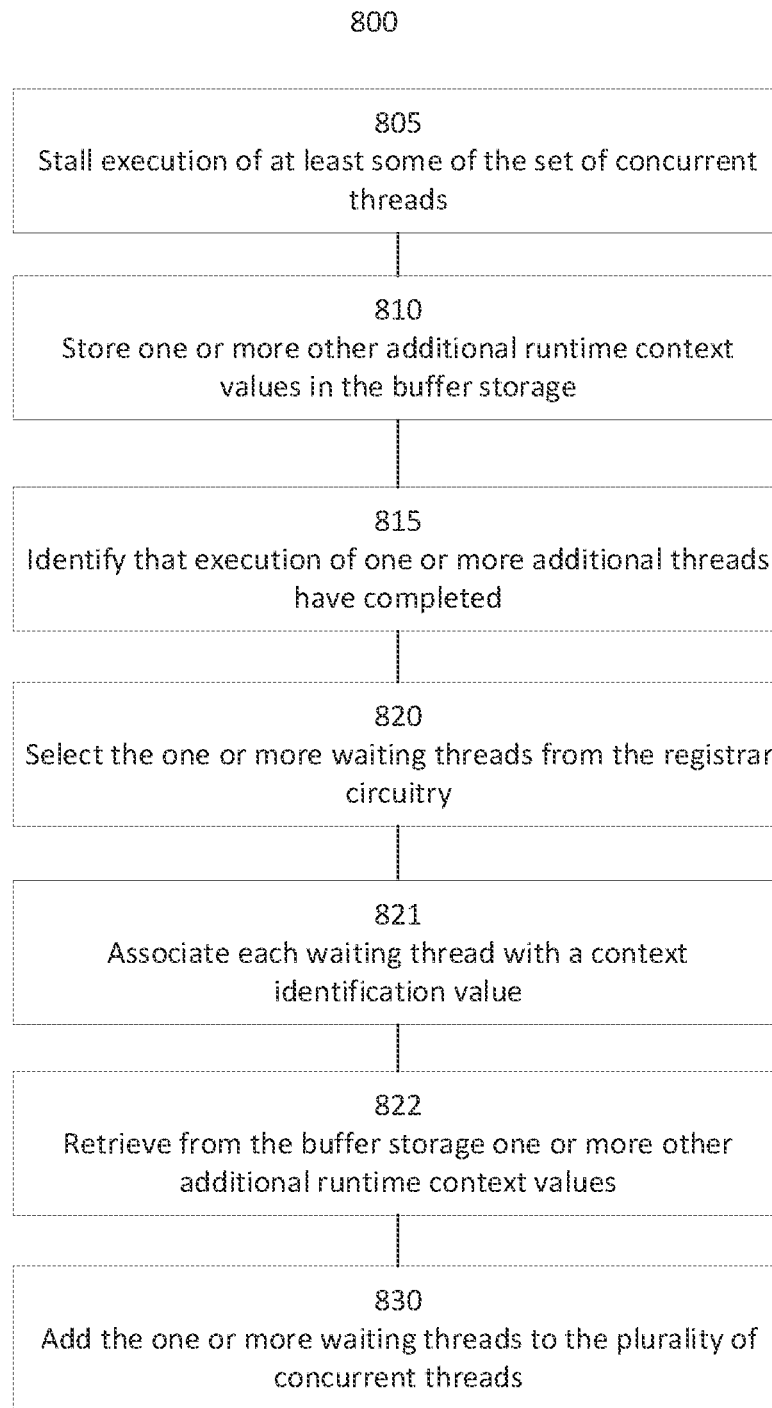
FIG. 8 is a flowchart schematically representing yet another optional flow of operations for a processing grid, according to some embodiments.

Reference is now made also to FIG. 8, showing a flowchart schematically representing yet another optional flow of operations 800 for a processing grid, according to some embodiments. Optionally, in 810, processing circuitry 210 stores in buffer storage 410 one or more additional runtime context values of one or more waiting threads. It may be beneficial to start executing the set of concurrent threads only when there are sufficient waiting threads, to increase utilization of the plurality of logical elements while waiting for execution of the one or more identified operations of one or more of the set of concurrent threads to complete. Thus, in 805, processing grid 210 optionally stalls execution of at least some of the set of concurrent threads until an amount of the one or more waiting threads exceeds a threshold value. Optionally, processing grid 210 uses registrar circuitry 411 to stall execution of the at least some of the set of concurrent threads.

Optionally, in each of a plurality of iterations, in 815 processing grid 210 identifies that execution of one or more additional threads of the plurality of concurrent threads has completed. Optionally, in 820 processing grid 210 selects at least one waiting thread from registrar circuitry 411, and in 822 processing grid 210 optionally retrieves from buffer storage 410 one or more additional runtime context values of the at least one waiting thread. Optionally, processing grid 210 uses buffer dispatch circuitry 412 to retrieve the one or more additional runtime context values.

Optionally, processing grid 210 adds the one or more additional threads that have completed to one or more other buffer storages.

In 830, processing grid 210 optionally adds the at least one waiting thread to the plurality of concurrent threads for execution by the plurality of logical elements 211. Optionally, adding the at least one waiting thread to the plurality of concurrent threads comprises storing the one or more additional runtime context values of the at least one waiting thread in context storage 212. Storing the one or more additional runtime context values of the at least one waiting thread in context storage 212 facilitates executing the at least one waiting thread in 612 of method 600 above.

Optionally, in 830 processing grid 210 loads the one or more additional runtime context values of the at least one waiting thread to one or more of the plurality of logical elements, to initiate execution of the at least one waiting thread without using the context storage 212.

Optionally, in 821 processing grid 210 associates each waiting thread of the at least one waiting thread (that is to be added to the plurality of concurrent threads in 830) with a context identification value. Optionally, the context identification value is indicative of the waiting thread's context in context storage 212. For example the context identification value may be a thread identification value of the waiting thread.

In some embodiments each group of waiting threads of one or more groups of waiting threads of the one or more waiting threads may be managed using some common resources. In such embodiments, buffer dispatcher 412 is optionally configured to generate in buffer storage 410, for at least one group of the one or more groups of waiting threads, a common thread context that is associated with each of the at least one group of waiting threads. Optionally, buffer dispatcher 412 is configured to generate in registrar circuitry 411 a common registrar entry associated with each of the at least one group of waiting threads. Optionally, when selecting a new thread of the at least one group of waiting threads as the at least one waiting thread in 820, optionally buffer dispatcher 412 is configured to compute one or more private context values of the new thread. Optionally, the one or more private context values are derived from a row index in buffer storage 410 or another row index in context storage 212. Optionally, the one or more private context values are derived from a column index in buffer storage 410 or another column index in context storage 212. Optionally, a private value is a running counter, incrementing or decrementing sequentially using a step value, optionally using a modulo operation. Optionally, a private value computed using a hash function. Optionally, a private value is computed using a function that is to locality of a data structure. Optionally, a private value is an identified value.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant processing grids will be developed and the scope of the term processing grid is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for processing a plurality of concurrent threads, comprising:
   at least one reconfigurable processing grid, comprising:
      a plurality of logical elements; and
      a context storage, storing a plurality of thread contexts, each thread context for one of a plurality of concurrent threads, each concurrent thread implementing a dataflow graph comprising a plurality of operations comprising at least one identified operation, where each of the plurality of thread contexts comprises for the concurrent thread thereof at least one runtime context value of the dataflow graph implemented thereby; and
   at least one hardware processor configuring the at least one reconfigurable processing grid to:
      execute a first thread of the plurality of concurrent threads; and
      while executing the first thread:
         storing the at least one runtime context value of the first thread in the context storage;
         while waiting for completion of execution of the at least one identified operation of the plurality of operations of the first thread by at least one identified logical element of the plurality of logical elements, executing the at least one identified operation of a second thread of the plurality of concurrent threads by the at least one identified logical element; and
         when execution of the at least one identified operation of the first thread completes:
            retrieving the at least one runtime context value of the first thread from the context storage; and
            executing at least one other operation of the plurality of operations of the first thread.

2. The system of claim 1, wherein the context storage comprises a plurality of context entries, each for storing a plurality of runtime context values of one of the plurality of thread contexts.

3. The system of claim 2, wherein for at least one thread of the plurality of concurrent threads, the plurality of runtime context values of the at least one thread is stored in more than one context entry of the plurality of context entries.

4. The system of claim 3, wherein the plurality of context entries is organized in a table having a plurality of rows, one for each of the plurality of context entries; and
   wherein each row of the plurality of rows has a plurality of columns, such that each of the plurality of runtime context values of the thread context stored in the row is stored in a column of the plurality of columns.

5. The system of claim 4, wherein the dataflow graph comprises a plurality of nodes and a plurality of edges;
   wherein at least one node of the plurality of nodes implements a lookup-table; and
   wherein configuring the at least one reconfigurable processing grid for executing the first thread comprises storing the lookup table in at least one other column of the plurality of columns.

6. The system of claim 2, wherein the at least one reconfigurable processing grid is further configured for:
   when execution of the at least one identified operation of the first thread completes:
      storing in a context entry of the plurality of context entries, where the context entry is for storing at least part of the thread context of the first thread, at least one outcome value that is an outcome of executing the at least one identified operation of the first thread.

7. The system of claim 2, wherein a first context entry of the plurality of context entries stores a plurality of runtime context values of the first thread; and
   wherein the at least one reconfigurable processing grid is further configured for:
      computing an identification that the first context is complete according to an outcome of at least one test applied to the plurality of runtime context values of the first context entry; and
      retrieving the at least one runtime context value of the first thread and executing the at least one other operation subject to the identification that the first context is complete.

8. The system of claim 7, wherein the at least one reconfigurable processing grid further comprises dispatching circuitry for applying the at least one test to the plurality of runtime context values.

9. The system of claim 8, wherein applying the at least one test to the plurality of runtime context values comprises the dispatching circuitry executing a set of testing instructions.

10. The system of claim 7, wherein the at least one reconfigurable processing grid is further configured for selecting the first thread for executing the at least one other operation of the plurality of operations thereof according to a dispatch policy.

11. The system of claim 7, wherein the at least one reconfigurable processing grid is further configured for:
subject to a mark added to one or more context entries of the plurality of context entries, where the one or more context entries are for storing at least part of the thread context of the first thread, executing at least one of:
declining to execute the at least one other operation of the plurality of operations of the first thread; and
providing at least one of the plurality of thread context values of the first thread to at least one other software object.

12. The system of claim 1, wherein the dataflow graph comprises a plurality of nodes and a plurality of edges;
wherein the at least one identified operation is represented in the dataflow graph by at least one identified node of the plurality of nodes;
wherein the at least one hardware processor is further configured for identifying in the dataflow graph a sub-graph (residual sub-graph) such that the residual sub-graph consists of a subset of nodes of the plurality of nodes and a subset of edges of the plurality of edges, where no path exists in the dataflow graph between any two of the at least one identified node, where for each node of the subset of nodes no path exists in the dataflow graph between the at least one identified node and the node, and where for each edge of the subset of edges no path exists in the dataflow graph between the at least one identified node and the edge; and
wherein the at least one runtime context value is at least one edge value of at least one of the subset of edges.

13. The system of claim 12, wherein the dataflow graph is a directed graph;
wherein each of the plurality edges has a head node of the plurality of nodes and a tail node of the plurality of nodes;
wherein the subset of nodes comprises one or more entry nodes such that each of the one or more entry nodes is an entry node of the residual sub-graph where the entry node is not a head node of any of the subset of edges; and
wherein the at least one runtime context value is at least one input value of at least one of the one or more entry nodes.

14. The system of claim 1, wherein the at least one identified operation comprises at least one of: a memory access operation, a floating-point mathematical operation, executing another computation-graph, an access to a co-processor, and an access to a peripheral device connected to the at least one reconfigurable processing grid.

15. The system of claim 1, wherein the plurality of concurrent threads is a subset of a set of concurrent threads, each of the set of concurrent threads implementing the dataflow graph;
wherein the system further comprises a buffer storage, for storing another plurality of thread contexts, each for at least one of the set of concurrent threads; and wherein the at least one hardware processor is further configured for further configuring the at least one reconfigurable processing grid for:
storing in the buffer storage one or more additional runtime context values of one or more waiting threads, where the one or more waiting threads are not members of the plurality of concurrent threads; and
in each of a plurality of iterations:
identifying that execution of at least one additional thread of the plurality of concurrent threads has completed;
for at least one of the one or more waiting threads, retrieving from the buffer storage at least one additional runtime context value thereof; and
adding the at least one waiting thread to the plurality of concurrent threads for execution by the plurality of logical elements.

16. The system of claim 15,
wherein the at least one reconfigurable processing grid further comprises:
registrar circuitry for the purpose of tracking the one or more waiting threads; and
additional dispatching circuitry for the purpose of managing execution of the plurality of concurrent threads;
wherein the additional dispatching circuitry is configured for:
selecting the at least one waiting thread from the registrar circuitry;
retrieving from the buffer storage the at least one additional runtime context value of the at least one waiting thread; and
adding the at least one waiting thread to the plurality of concurrent threads for execution by the plurality of logical elements.

17. The system of claim 16, wherein adding the at least one waiting thread to the plurality of concurrent threads comprises storing the at least one additional runtime context value of the at least one waiting thread in the context storage.

18. The system of claim 16, wherein the additional dispatching circuitry is further configured for:
associating each of the at least one waiting thread with a context identification value, indicative of the waiting thread's thread context in the context storage.

19. The system of claim 16, wherein the buffer storage comprises a plurality of buffer entries, each for storing a thread context of at least one of the one or more waiting threads;
wherein the registrar circuitry comprises a plurality of registrar entries, each for the purpose of tracking at least one of the one or more waiting threads;
wherein the additional dispatching circuitry is further configured for:
for at least one group of waiting threads of the one or more waiting threads, generating in the buffer storage a common thread context associated with each of the at least one group of waiting threads;
generating in the registrar circuitry a common registrar entry associated with each of the at least one group of waiting threads; and
when selecting from the registrar circuitry a new thread of the at least one group of waiting threads as the at least one waiting thread, computing at least one private context value of the new thread.

20. The system of claim 16, wherein the registrar circuitry is further configured for stalling execution of at least some of the set of concurrent threads until an amount of the one or more waiting threads exceeds a threshold value.

21. The system of claim 1, wherein the plurality of logical elements are a plurality of reconfigurable logical elements, organized in a plurality of computation groups; and
wherein the at least one identified logical element is a subset of the plurality of computation groups.

22. The system of claim 1, wherein a runtime context value of the dataflow graph is an input value or an output value of a node of a plurality of nodes of the dataflow graph.

23. The system of claim 1, wherein the at least one hardware processor is further configured for configuring the at least one reconfigurable processing grid for executing the first thread in each of a plurality of thread iterations;
wherein the context storage comprises at least one additional context entry for storing an additional plurality of runtime context values of the dataflow graph, where the additional plurality of runtime context values are common to the plurality of thread iterations; and
wherein when execution of the at least one identified operation of the first thread completes, the reconfigurable processing grid is further configured for retrieving from the context storage at least one of the additional plurality of runtime context values.

24. The system of claim 1, wherein the at least one reconfigurable processing grid further comprises at least one other context storage; and
wherein the at least one hardware processor is further configured for configuring the at least one reconfigurable processing grid for:
when execution of the at least one identified operation of the first thread completes:
storing at least one additional runtime context value of the first thread in the at least one other context storage;
further executing the first thread; and
while further executing the first thread:
while waiting for completion of further execution of at least one other identified operation of the plurality of operations of the first thread by at least one other identified logical element of the plurality of logical elements, executing the at least one other identified operation of another second thread of the plurality of threads by the at least one other identified logical element.

25. The system of claim 1, wherein the at least one reconfigurable processing grid further comprises at least one counter;
wherein the plurality of concurrent threads comprises a group of concurrent threads associated with the at least one counter; and
wherein the at least one runtime context value comprises at least one counter value read from the at least one counter by accessing the at least one counter.

26. The system of claim 25, wherein each of the group of concurrent threads implements an identified dataflow graph.

27. The system of claim 25, wherein accessing the at least one counter comprises an atomic access comprising reading the at least one counter and incrementing the at least one counter.

28. The system of claim 27, wherein the at least one counter is a sequence of counters; and
wherein incrementing the at least one counter comprises at least one of:
incrementing a first counter of the sequence of counters using modular arithmetic and incrementing a second counter, consecutive to the first counter in the sequence of counters, subject to the first counter wrapping around after being incremented; and
incrementing a first counter of the sequence of counters and subject to the first counter exceeding a maximum value:
incrementing a second counter, consecutive to the first counter in the sequence of counters; and
at least one of:
setting the first counter to a new value computed using the second counter; and
setting the maximum value to another new value computed using the second counter.

29. A method for processing a plurality of concurrent threads, comprising:
executing a first thread of a plurality of concurrent threads, each concurrent thread implementing a dataflow graph comprising a plurality of operations comprising at least one identified operation; and
while executing the first thread:
storing in a context storage, where the context storage is configured for storing a plurality of thread contexts, each thread context for one of the plurality of concurrent threads, where each of the plurality of thread contexts comprises for the concurrent thread thereof at least one runtime context value of the dataflow graph implemented thereby, the at least one runtime context value of the dataflow graph implemented by the first thread;
while waiting for completion of execution of the at least one identified operation of the plurality of operations of the first thread by at least one identified logical element of a plurality of logical elements, executing the at least one identified operation of a second thread of the plurality of concurrent threads by the at least one identified logical element; and
when execution of the at least one identified operation of the first thread completes:
retrieving the at least one runtime context value of the first thread from the context storage; and
executing at least one other operation of the plurality of operations of the first thread.

30. A software program product for executing a plurality of concurrent threads, comprising:
a non-transitory computer readable storage medium;
first program instructions for executing a first thread of a plurality of concurrent threads, each concurrent thread implementing a dataflow graph comprising a plurality of operations comprising at least one identified operation; and
second program instructions for: while executing the first thread:
storing in a context storage, where the context storage is configured for storing a plurality of thread contexts, each thread context for one of the plurality of concurrent threads, where each of the plurality of thread contexts comprises for the concurrent thread thereof at least one runtime context value of the dataflow graph implemented thereby, the at least one runtime context value of the dataflow graph implemented by the first thread;
while waiting for completion of execution of the at least one identified operation of the plurality of operations of the first thread by at least one identified logical element of a plurality of logical elements, executing the at least one identified operation of a second thread of the plurality of concurrent threads by the at least one identified logical element; and when execution of the at least one identified operation of the first thread completes:
retrieving the at least one runtime context value of the first thread from the context storage; and
executing at least one other operation of the plurality of operations of the first thread;
wherein the first and second program instructions are executed by at least one computerized processor from the non-transitory computer readable storage medium.

* * * * *

UNITED STATES PATENT AND TRADEMARK OFFICE
CERTIFICATE OF CORRECTION

| | | |
|---|---|---|
| PATENT NO. | : 11,875,153 B1 | Page 1 of 1 |
| APPLICATION NO. | : 18/218152 | |
| DATED | : January 16, 2024 | |
| INVENTOR(S) | : Elad Raz et al. | |

It is certified that error appears in the above-identified patent and that said Letters Patent is hereby corrected as shown below:

On the Title Page

In the section titled (72) Inventors:
After "Ilan TAYARI, Tzur Hadassa (IL)",
Insert the following:
-- Ronen GAL, Ramat Gan (IL) --

Signed and Sealed this
Thirtieth Day of September, 2025

John A. Squires
*Director of the United States Patent and Trademark Office*